Sept. 2, 1958  V. A. ROMITO  2,850,393
FROZEN FOOD TELLTALE
Filed July 23, 1956

INVENTOR
VINCENT A. ROMITO
BY
ATTORNEY

United States Patent Office 2,850,393
Patented Sept. 2, 1958

2,850,393

FROZEN FOOD TELLTALE

Vincent A. Romito, North Hollywood, Calif., assignor to Aseptic Thermo Indicator Company, North Hollywood, Calif., a corporation of California Application July 23, 1956, Serial No. 599,406

8 Claims. (Cl. 99—192)

This invention relates to a visual telltale device for use in connection with frozen packages of food or the like. More particularly it relates to a visual indicator which shows whether or not a frozen material has been warmed to a temperature and for a sufficient length of time to cause deterioration to an undesirable or dangerous point of spoilage or change, or of production of unfavorable odors and tastes. The spoilage of quick frozen food which has become unfrozen is generally more rapid than spoilage of fresh food, and under present marketing conditions for frozen food, it is highly desirable to have a reliable telltale device associated with the frozen food packages to indicate if such packages may have been exposed to conditions of temperature and time which would be likely to produce spoilage. It is a requirement that the telltale accompany the food package from the time it is packed until it reaches the ultimate consumer, and the device must be of such a nature that any re-freezing of the package will not destroy the telltale indication of the prior history of the package as it relates to integrated temperature and time.

The principal object of the present invention is to provide a warning or telltale device for frozen food or other goods which automatically integrates the effects, as they relate to spoilage or change, of time and temperature from the initial freezing of the material until it is inspected. Another object is to provide a warning or telltale device which is irreversible in its indication of integrated temperature time effects. A still further object is to provide a visual indicator for a telltale device which indicates generally whether or not there is any danger of frozen food being spoiled. A further object is to provide a warning or telltale device of the class described which is inexpensive to make and to install in or on the packages and which does not depend for its telltale activity on the specific nature of the contents of the package. Yet another object is to provide a telltale device which will perform its function irrespective of its orientation or environment. Another object is to provide a telltale which, prior to its activation by freezing, may be kept at ordinary temperatures without deterioration.

Figure 1:
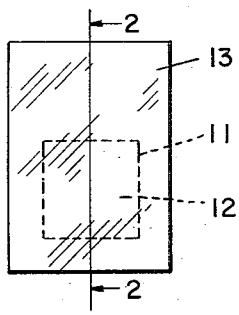
Figure 2:
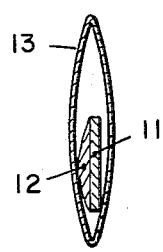
Figure 3:
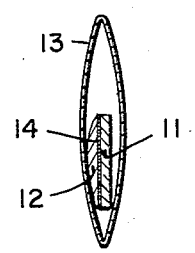
Figure 4:
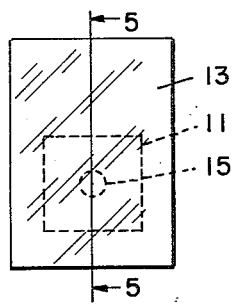
Figure 5:
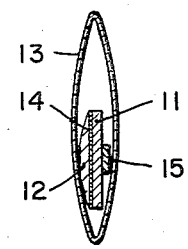
Figure 10:
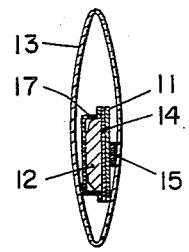
Figure 6:
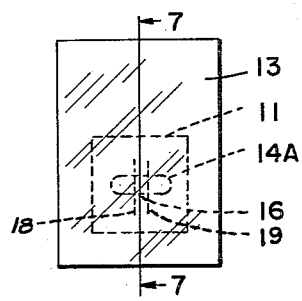
Figure 7:
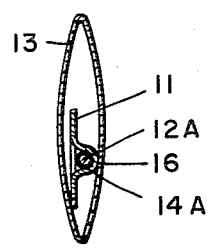
Figure 8:
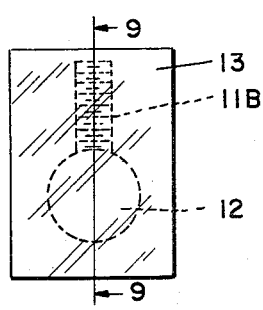
Figure 9:
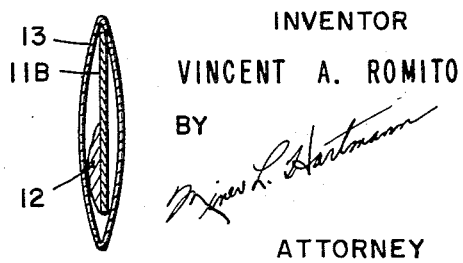

These and other objects of the invention are attained by the illustrative devices set forth in the following description, reference being made to the accompanying drawings in which:

Fig. 1 is a plan view of one form of my invention;
Fig. 2 is a cross-sectional view taken on the line 2—2 of Fig. 1;
Fig. 3 is a cross-sectional view similar to Fig. 2 showing a modified form of my invention;
Fig. 4 is a plan view of another modification of my invention;
Fig. 5 is a cross-sectional view taken on the line 5—5 of Fig. 4;
Fig. 6 is a plan view of another alternative form of my invention;
Fig. 7 is a cross-sectional view taken on the line 7—7 of Fig. 6;
Fig. 8 is a plan view of still another modification of my invention;
Fig. 9 is a cross-sectional view taken on the line 9—9 of Fig. 8; and
Fig. 10 is a cross-sectional view of another form of the invention as shown in Figs. 4 and 5, in which the paste mass is enclosed in an open-faced container.

Referring to the drawing, particularly Figs. 1 and 2, showing a simple form of my invention, a base member 11 consisting of a water absorbent material such as paper or blotter stock is provided on its back surface with a mass of semi-solid paste 12 constituted as given later herein in detail, the base member and the mass of paste being enclosed within an envelope 13 of transparent waterproof and oil proof material such as for example "mylar" or impervious cellophane. The base member is dry but has been previously impregnated with a water soluble hydrogen-ion or pH indicator material or dye, or other visual indicator.

The mass of semi-solid paste consists essentially of an aqueous liquid dispersed as a stable emulsion in an oil by means of a suitable emulsifying agent, the oil being the external phase. The consistency is that of a stiff or semi-solid paste which generally retains its form but which can be distorted by pressure, and which adheres to the surface of the base member. When such an emulsion is frozen so that the aqueous phase becomes solid, the emulsion is broken, and upon thawing out of the solid water particles, liquid water or aqueous solution is formed in undispersed condition. This aqueous liquid then is absorbed by the absorbent base member which contains the pH indicator substance. The aqueous liquid forming the emulsion is modified by the addition of a small amount of an acid or of an alkali, so that with a selected pH indicator having a distinctly higher or lower pH value in the absorbent base member, the color of said base is visibly changed after the thawing. Other indicator materials may be used, as for example, the blending of two colors to form a different color, or the bleaching out of the color of the aqueous phase by a bleaching reagent in the base, or the like.

While the simplified form of my invention shown in Figs. 1 and 2 will accomplish the objects of the invention, the preferred form is that shown in Fig. 3, in which a thin membrane or coating 14 made of a water-soluble oil-insoluble material is interposed between the emulsion mass and the absorbent base. An important advantage of my telltale device is that the unactivated telltales may be stored for a reasonably long period of weeks or months without spoiling their usefulness to indicate subsequent thawing after original freezing. The use of the coating or membrane 14 assures that the color indication will not be prematurely changed prior to activation by freezing, and that the absorption of the oil phase of the emulsified paste mass 12 will be retarded or prevented.

The membrane 14 may consist of any suitable water-soluble, oil-insoluble film forming material such as cellulose gum ("methocel"), gum arabic, gum tragacanth, alginates, gelatine, agar-agar or the like. The membrane forming material is first dissolved in water, and is then sprayed or brushed or otherwise applied to the surface of the base 11 which is to be contacted by the emulsion paste 12, and, following drying, is ready for use.

As previously described, the base member 11 may be impregnated throughout, or coated on at least a visible portion of the front surface opposite the paste-contacting surface, with a suitable water activated indicator such as a pH indicator dye such as brom-thymol blue, methyl red, chlorophenol red, brom-cresol purple and the like, the indicator dye being previously converted to the color condition corresponding to a pH which is distinctly higher or lower than the pH condition of the aqueous phase of the emulsion paste. That is, if the aqueous phase of the emulsion is acidic and has a pH value of 2 (for example), the indicator dye which is applied to or impregnated in the base member 11 is converted to the color corresponding to a pH of 8 (for example). Methyl red indicator dye is yellow in the pH range of 7 to 9, and is red in the pH range of 2 to 4. Other indicator dyes change colors within other ranges of pH values, as is well known in the art. (For example see Perry's Chemical Engineer's Handbook, 2nd edition, McGraw-Hill, pp. 568–9, and other standard handbooks.) The pH value of the aqueous portion of the emulsion paste may be above 7 on the alkaline side, in which case an indicator dye in the base member 11 is selected so that the color will be distinctly changed from its existing condition, when it is wetted by the alkaline aqueous liquid, for example thymol blue.

The emulsion paste consists essentially of an oil, an emulsifying agent, and an aqueous liquid, and the semisolid paste mass 12 may be made by any of the well known procedures and with well known materials for forming a water-in-oil type emulsion.

As specific examples of the emulsion paste compositions which I have found to give satisfactory performance in my invention, are the following:

*Example A*

One part by weight of oxalic acid was dissolved in 25 parts by weight of boiling water. This solution was then poured slowly into a previously prepared mixture of 10 parts by weight of "Vaseline" or semi-solid petrolatum and 0.5 part by weight of cholesterol, with vigorous stirring until a stiff semi-solid emulsion was formed.

*Example B*

Instead of semi-solid petrolatum, heavy white mineral oil may be substituted, and an emulsion formed in the same way.

*Example C*

One part by weight of diglycol oleate was dissolved in 20 parts by weight of boiling water, and then poured, with rapid stirring, into 30 parts by weight of heavy white liquid petrolatum. The aqueous portion of this composition may be made weakly acid with 1 part by weight of citric acid, if an acid reaction indicator is selected, or it may be made weakly alkaline with 1 part by weight of caustic soda, if an alkaline reaction indicator has been selected.

*Example D*

One part by weight of citric acid was dissolved in 25 parts by weight of water. This solution was blended into a mixture of 10 parts by weight of hydrogenated cottonseed oil (Crisco) and 10 grams by weight of "Atmul 122" (Atlas Powder Company's surface active ether and ester of polyhydric alcohol), following which the mixture was passed through a homogenizer.

It is well known that the rate of spoilage of foods varies not only with the temperature to which the food has been exposed, but also with the time of exposure to the higher temperatures. The use in my invention of a water soluble membrane between the base 11 and the paste emulsion mass provides one means for regulating the time element involved in causing a visible change of color in the indicator in the base member, the thickness of the membrane being varied to provide any required lag in the indicator color change. For example, with a dried membranes of "Methocel" (5 percent solution of 100 centipoises per second of methyl cellulose) of .0004" in thickness, the reaction time (color change) was 13 minutes; with a membrane of .0018" in thickness, the reaction time was 16.5 minutes; with a membrane of .0035" thickness, the reaction time was 32.5 minutes.

Another means for regulating the time factor for color change is to vary the thickness of the base member so that there is a controllable time lag in the color change on the visible front surface when water solution is liberated from the thawed emulsion. For example, using "Flintstone" blotter stock of thicknesses .020, .040 and .060 inch, the reaction times (change of color) under controlled conditions, were respectively 9 minutes, 17 minutes, and 2.5 hours.

In the modified form of my invention shown in Figs. 4 and 5, the indicator color material is applied as a surface layer or patch 15, so that the color change is not effected until enough aqueous solution has absorbed in and migrated through the thickness of the base member 11 to reach the patch.

A further modification of my telltale device is shown in Figs. 6 and 7, in which the oil-water emulsion 12A is held in a capsule 14A made of oil-resistant water-soluble material such as mentioned above for the membrane 14, the capsule 14A and contents being fastened by the band 16 formed by parallel slits 18 and 19 in the base member 11. When the water phase of the emulsion has been once frozen, and then thawed, the free aqueous solution dissolves the capsule, and the aqueous solution then is absorbed in the base and produces the color change as described above. Alternately, the capsule shown in Figs. 6 and 7 may be made of glass, brittle plastic, or other frangible material which will contain the aqueous reactant, and become broken when frozen, thus allowing the liquid produced by thawing to effect the color change in the base. The device in either case is enclosed in an oil-proof and water-proof envelope.

In Figs. 8 and 9 is shown another modification of my telltale device in which the contact between the paste mass 12 is at the base only of an elongated form of base member 11B, which is provided with a marked scale to show the distance that the liquid water has been absorbed, thus indicating not only that a temperature above freezing has been reached, but that the material has remained thawed for a period of time indicated by the scale. This modification is also enclosed in a water and oil proof envelope.

In Fig. 10 is shown a still further modification of my invention, in which the paste is enclosed in a open-faced insoluble container, the open face being juxtaposed on the membrane 14 which separates the paste from the base 11.

It will be understood that in its broader aspects my invention involves (1) the use of two or more reactants which on contact or intermingling produce a distinctive color change or other visible physical change; (2) the prevention of contact between the reactants until the device is activated through subjection to freezing temperatures; and (3) the breaking of the barrier to intimate contact of the reactants by freezing, and the delay in forming intimate contact or intermingling until the device has reached a more elevated temperature, above the solidification temperature of aqueous reactant. The reactants may be those producing acid or alkaline color changes, but may also include blending of different colors to produce a different color, such as yellow and blue dye to produce a green color, or the bleaching of colors.

While the barrier arrangement which I prefer is that represented by the emulsification of an aqueous phase in an oily or water repellant dispersal material as the external phase, my invention also contemplates the encapsulation of the aqueous phase in a frangible container which ruptures on freezing, and allows migration and contact or intermingling of the reactants to produce the visual change when aqueous liquid is liberated by thawing.

The advantages of my invention will be apparent from the above description. The telltale devices may be prepared and stored or shipped prior to freezing and have a reasonably long shelf life. The indicator changes only after the paste composition has been once frozen, which releases the liquid water which with its dissolved acid or alkali changes the color upon absorption into the base member. Even though the telltale is again frozen, the indicator color change is not reversed, but remains to tell the purchaser that the package has, at least at one time in its history, been thawed to the temperature at which liquid water is released from the emulsion. The telltale devices are inexpensive and do not in any way react with or contaminate the contents of the frozen package.

I claim:

1. A telltale device for a refrigerated package comprising a water absorbent base member having a pH indicator substance on at least a visible front surface thereof; a mass of semi-solid paste in contact with said base member on the back surface thereof, said paste consisting essentially of an aqueous liquid dispersed as a stable emulsion in an oil by means of an emulsifying agent, said oil being the external phase, said emulsion being characterized by being broken when subjected to the solidification temperature of said aqueous liquid followed by the thawing of said emulsion, said aqueous liquid being selected as to pH to be effective to change the color of said pH indicator when said aqueous liquid has been initially frozen in said emulsion and subsequently thawed to a liquid state from the broken emulsion phase; and a water- and oil-proof enclosure for said base member and said paste mass, said enclosure being transparent adjacent said front surface of said base, whereby a color change in said pH indicator substance may be observed following the absorption of liquid aqueous solution into said base.

2. A telltale device for a refrigerated package comprising a water absorbent base member having a pH indicator substance previously distributed therein; a mass of semi-solid paste in contact with said base member on the back surface thereof, said paste consisting essentially of an aqueous liquid dispersed as a stable emulsion in an oil by means of an emulsifying agent, said oil being the external phase, said emulsion being characterized by being broken when subjected to the solidification temperature of said aqueous liquid followed by the thawing of said emulsion, said aqueous liquid being selected as to pH to be effective to change the color of said pH indicator when said aqueous liquid has been initially frozen in said emulsion and subsequently thawed to a liquid state from the broken emulsion phase; and a water- and oil-proof enclosure for said base member and said paste mass, said enclosure being transparent adjacent said front surface of said base, whereby a color change in said pH indicator substance may be observed following the absorption of liquid aqueous solution into said base.

3. A telltale device for a refrigerated package comprising a water absorbent base member having a pH indicator substance disposed as a patch on the front surface thereof; a mass of semi-solid paste in contact with said base member on the back surface thereof, said paste consisting essentially of an aqueous liquid dispersed as a stable emulsion in an oil by means of an emulsifying agent, said oil being the external phase, said emulsion being characterized by being broken when subjected to the solidification temperature of said aqueous liquid followed by the thawing of said emulsion, said aqueous liquid being selected as to pH to be effective to change the color of said pH indicator when said aqueous liquid has been initially frozen in said emulsion and subsequently thawed to a liquid state from the broken emulsion phase; and a water- and oil-proof enclosure for said base member and said paste mass, said enclosure being transparent adjacent said patch, whereby a color change in said pH indicator substance may be observed following the absorption of liquid aqueous solution into said base and said patch.

4. A telltale device for a refrigerated package comprising a water absorbent base member having a pH indicator adjusted to a pH of 7 to 9 substance on at least the front surface thereof; a mass of semi-solid paste in contact with said base member on the back surface thereof, said paste consisting essentially of an aqueous liquid dispersed as a stable emulsion in an oil by means of an emulsifying agent, said oil being the external phase, said emulsion being characterized by being broken when subjected to the solidification temperature of said aqueous liquid followed by the thawing of said emulsion, said aqueous liquid having a pH value of 2 to 4, whereby to change the color of said pH indicator when said aqueous liquid has been initially frozen in said emulsion and subsequently thawed to a liquid state from the broken emulsion phase; and a water- and oil-proof enclosure for said base member and said paste mass, said enclosure being transparent adjacent said front surface of said base, whereby a color change in said pH indicator substance may be observed following the absorption of liquid aqueous solution into said base.

5. A telltale device for a refrigerated package comprising an elongated water absorbent base member having a pH indicator substance distributed therein, and having a graduated scale marked on a front surface thereof; a mass of semi-solid paste in contact with said base member at one end of said graduated scale, said paste consisting essentially of an aqueous liquid dispersed as a stable emulsion in an oil by means of an emulsifying agent, said oil being the external phase, said aqueous liquid being selected as to pH to be effective to change the color of said pH indicator when said aqueous liquid has been initially frozen in said emulsion and subsequently thawed to a liquid state from the broken emulsion phase; and a water- and oil-proof enclosure for said base member and said paste mass, said enclosure being transparent adjacent said graduated scale, whereby a color change in said pH indicator substance may be observed for a distance indicated on said graduated scale.

6. A telltale device for a refrigerated package comprising a water absorbent base member having a pH indicator substance on at least a visible front surface thereof; a mass of semi-solid paste in contact with said base member on the back surface thereof, said paste consisting essentially of an aqueous liquid dispersed as a stable emulsion in an oil by means of an emulsifying agent, said oil being the external phase, said aqueous liquid being selected as to pH to be effective to change the color of said pH indicator when said aqueous liquid has been initially frozen in said emulsion and subsequently thawed to a liquid state from the broken emulsion phase; a water-soluble oil-resistant membrane disposed between said mass of semi-solid paste and said water absorbent paste; and a water- and oil-proof enclosure for said base member and said paste mass, said enclosure being transparent adjacent said front surface of said base, whereby a color change in said pH indicator substance may be observed following the absorption of liquid aqueous solution into said base.

7. A telltale device for a refrigerated package comprising a water absorbent base member having a pH indicator substance on at least a visible front surface thereof; a mass of semi-solid paste in contact with said base member on the backsurface thereof, said paste consisting essentially of an aqueous liquid dispersed as a stable emulsion in an oil by means of an emulsifying agent, said oil being the external phase, said aqueous liquid being selected as to pH to be effective to change the color of said pH indicator when said aqueous liquid has been initially frozen in said emulsion and subsequently thawed to a liquid state from the broken emulsion phase; a water-soluble oil-resistant membrane selected from the group consisting of cellulose gum, gum arabic, gum tragacanth, alkali alginates, gelatine and agar, disposed between said mass of semi-solid paste and said water absorbent base; and a water- and oil-proof enclosure for said base member and said paste mass, said enclosure being transparent adjacent said front surface of said base, whereby a color change in said pH indicator substance may be observed following the absorption of liquid aqueous solution into said base.

8. A telltale device for a refrigerated package comprising a water absorbent base member having a pH indicator substance on at least a visible front surface thereof; a mass of semi-solid paste in contact with said base member on the back surface thereof, said paste consisting essentially of an aqueous liquid dispersed as a stable emulsion in an oil by means of an emulsifying agent, said oil being the external phase, said aqueous liquid being selected as to pH to be effective to change the color of said pH indicator when said aqueous liquid has been initially frozen in said emulsion and subsequently thawed to a liquid state from the broken emulsion phase; a water-soluble oil-insoluble capsule enclosing said mass; and a water- and oil-proof enclosure for said base member and said capsule, said enclosure being transparent adjacent said front surface of said base, whereby a color change in said pH indicator substance may be observed following the absorption of liquid aqueous solution into said base.

References Cited in the file of this patent

UNITED STATES PATENTS

| | | |
|---|---|---|
| 1,535,536 | MacDonald | Apr. 28, 1925 |
| 2,460,215 | Chase | Jan. 25, 1949 |
| 2,560,537 | Andersen | July 17, 1951 |
| 2,662,018 | Smith | Dec. 8, 1953 |